UNITED STATES PATENT OFFICE.

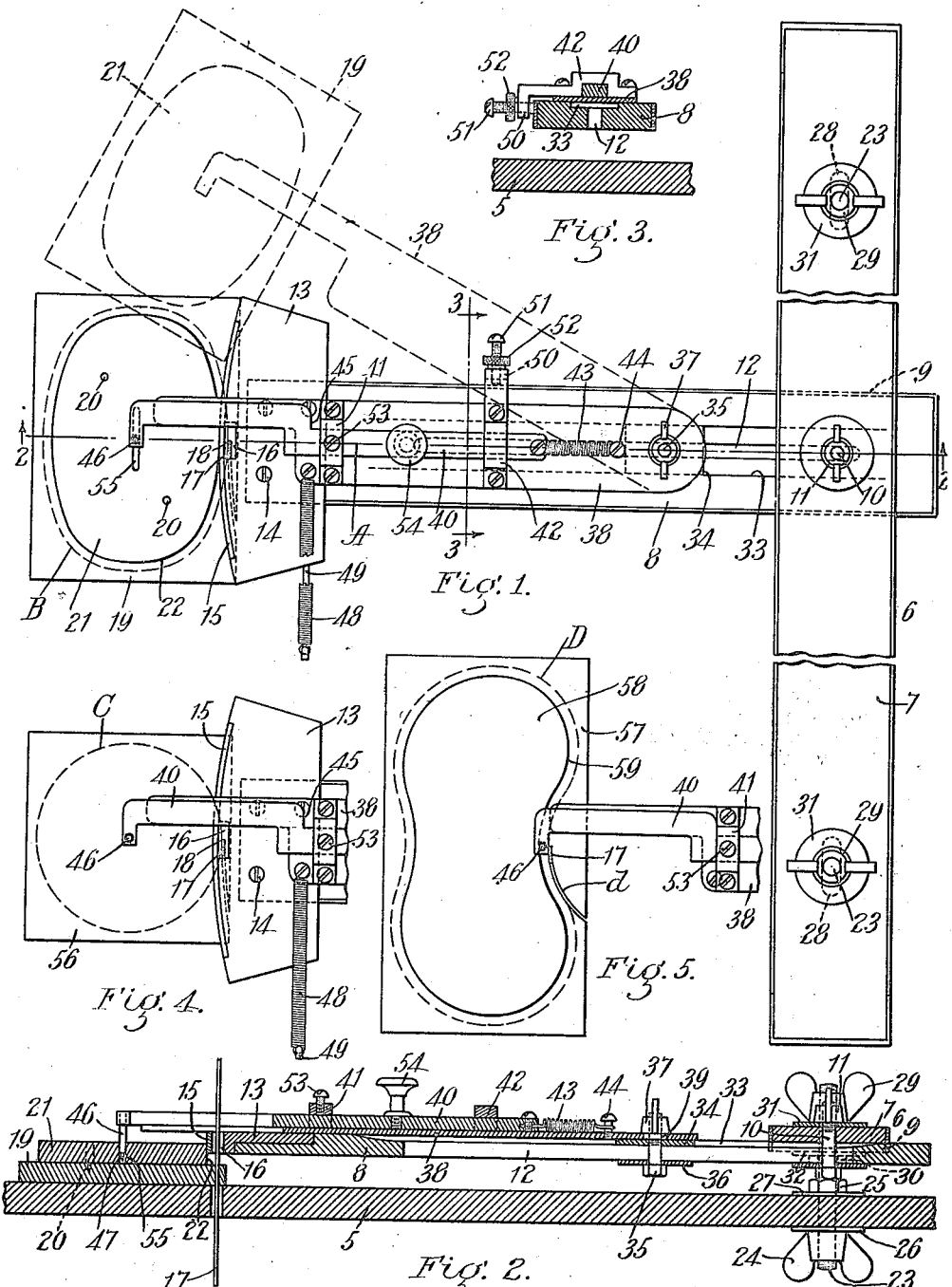

GEORGE H. WALLACE, OF CAMBRIDGE, MASSACHUSETTS.

ATTACHMENT FOR BAND SAWS.

1,426,932.   Specification of Letters Patent.   Patented Aug. 22, 1922.

Application filed May 7, 1920. Serial No. 379,512.

*To all whom it may concern:*

Be it known that I, GEORGE H. WALLACE, a citizen of the United States, residing at Cambridge, in the county of Middlesex and State of Massachusetts, have invented new and useful Improvements in Attachments for Band Saws, of which the following is a specification.

This invention relates to an attachment for band saw machines.

In using band saw machines, it has been customary, especially if the piece to be cut out is of irregular form, to first mark out the desired finished shape upon a piece of wood to be sawed, and to then cut the piece out by the pattern marked thereon. In other cases where irregular shaped pieces are to be produced, the work is first marked out on the piece of wood to be cut, and the piece is then cut out to finished shape by a moulding machine.

It is the object of this invention to provide an attachment for a band saw machine which eliminates the work of laying out the pattern on the wood and of cutting out the finished piece on a moulding machine, the work being done directly by the band saw machine, thus saving a large amount of time and expense.

It is also an object of the invention to so construct the device that the same may be easily adapted to position the piece of wood relatively to the work guide and saw blade in accordance with the requirements of the variously shaped pieces of wood which it is desired to produce.

The invention consists in the combination and arrangement of parts set forth in the following specification and particularly pointed out in the claims thereof.

Referring to the drawings:

Figure 1 is a plan view of my improved attachment for a band saw machine, illustrating the manner of using the device in sawing out elliptical shaped pieces of material.

Fig. 2 is a sectional elevation taken on the line 2—2 of Fig. 1.

Fig. 3 is a transverse sectional elevation taken on the line 3—3 of Fig. 1.

Fig. 4 is a plan view of the portion of the device adjacent to the work guide, illustrating the manner of using the device in sawing out circular pieces of material.

Fig. 5 is a plan view similar to Fig. 4 illustrating the method of sawing irregular shaped pieces of material.

Like numerals refer to like parts throughout the several views of the drawings.

In the drawings 5 is a portion of the table of a band saw machine, and 6 is a guide frame embodying my invention, and consisting of a member 7 and another member 8 slidable transversely of the member 7 in a guideway 9 provided in said member 7 and extending transversely thereacross at right angles thereto.

The member 8 is clamped to the member 7 by a clamp bolt 10 and thumb nut 11. The member 8 is provided with a slot 12 extending longitudinally thereof through which the bolt 10 projects so that by loosening the thumb nut 11, the member 8 can be slid along transversely of and upon the member 7 in the guideway 9 to any desired position, and then clamped firmly thereto by tightening the thumb nut 11. In order to render the device light and cheap to manufacture, the members 7 and 8 are preferably formed of flat strips of material.

Upon the outer end of the member 8 a guide block 13 is fastened, said guide block being detachably fastened thereto by means of screws 14. Said guide block 13 has a convexly curved guide plate 15 fastened thereto which extends across one edge of a notch 16, said notch 16 and guide plate 15 forming a closed slot through which a band saw 17 passes. The cutting edge 18 of the band saw is preferably in alignment with the center line A of the member 8.

A piece of material 19 from which the finished piece is to be cut has temporarily fastened thereto by pins 20 a templet 21, the edge 22 of which is adapted to engage the guide plate 15.

The guide frame 6 as a whole can be raised and lowered to accommodate different thicknesses of material to be cut by means of screw threaded studs 23 which are clamped to the band saw table 5 by nuts 24 and 25 and collars 26 and 27. The screw threaded studs 23 extends through slots 28 in the member 7, and said member 7 is clamped to the studs 23 by means of nuts 29 and 30, and collars 31 and 32. The studs 23 thus constitute standards or supports projecting upwardly from the band saw table 5, upon which the guide frame 6 is supported. By adjusting the nuts 29 and 30 upwardly or downwardly upon the studs 23, the distance between the guide frame member 8 and the top of the table 5 may be varied to accommodate different thicknesses of material to be cut.

Formed in the upper surfaces of the member 8 is a groove 33 in which a block 34 is adapted to slide and be clamped by a bolt 35, collar 36 and nut 37, the said bolt passing through the slot 12 previously described. A plate 38 is pivoted upon a shouldered portion 39 of the nut 37, being attached to the block 34 by said nut, and said bolt, and thereby being moved longitudinally of the member 8, together with the block 34. The plate 38 rests upon the upper surfaces of the member 8 and the guide block 13. A slide 40 is mounted to slide longitudinally upon the upper surface of the plate 38, being guided by members 41 and 42, which are fastened to the upper surface of said plate. A spring 43, one end of which is fastened to a screw 44, carried by the plate 38, and the other end fastened to the slide 40 normally tends to pull a shoulder 45 formed upon said slide against the guide member 41.

A guide pin 46 which is also adaptable for use as a centering pin, is located in the outer end of the slide 40, and projects downwardly therefrom, being provided with a pointed lower end 47. The guide pin 46 is normally located in alignment with the center line A of the member 8, being held in said position by a spring 48, one end of which is attached to the plate 38 and the other end being attached to an arm 49 which extends outwardly from the guide block 13. The guide member 42 is provided with an extension which terminates in a downwardly projecting arm 50, through which extends an adjusting screw 51 adapted to engage the edge of the member 8 as illustrated in Fig. 3. The adjusting screw 51 constitutes a stop to position the guide pin 46 upon the center line A, the spring 48 always tending to hold the adjusting screw 51 against the edge of the member 8. A lock nut 52 is provided to prevent the adjusting screw 51 from becoming loosened in the arm 50. The slide 40 may be adjusted longitudinally of the plate 38 to position the guide pin 46 relatively to the guide plate 15 and saw blade 17, and when correctly positioned may be securely held in said position by a screw 53 which is located in the guide member 41 and contacts with the upper surface of said slide. The slide 40 is provided with a suitable handle 54, by which it may be manipulated.

The device herein illustrated and described is adapted to be used in a different manner when sawing out different shaped pieces of material. In Figs. 1 and 2 the templet 21 is approximately elliptical in form, and is provided with a slot 55 extending longitudinally thereof into which the guide pin 46 projects. In this form the slide 40 yieldingly holds the templet 21 against the guide plate 15.

In Fig. 4 a square piece of material 56 is illustrated from which it is intended to saw a circular piece of wood. In this form the templet is dispensed with, and the pin 46 constitutes a centering pin.

In Fig. 5 a rectangular piece of material 57 is illustrated from which it is intended to saw an irregular piece of wood. In this form a templet 58 is provided, having a working edge 59 against which the guide pin 46 is adapted to contact.

The general operation of the device hereinbefore specifically described is as follows: The member 7, together with the parts supported thereon, is fastened to the work table 5 of the band saw machine by means of the studs 23, nuts 24 and 25, and collars 26 and 27. If it is desired to adjust the guide frame vertically to make a greater or less space between the guide frame and the top of the table 5, this is accomplished by means of the nuts 29 and 30 upon the studs 23. The member 8, together with the guide block 13, can be moved toward or away from the member 7 by means of the bolt 10 and thumb nut 11.

The guide frame as a whole can be moved laterally of the saw 17 in order to accommodate different widths of saws and still have the cutting edge of the saw in alignment with the center line A of the member 8 by loosening the nuts 29 and moving the member 7 longitudinally thereof, at which time the studs 23 will move in the slots 28, and then clamping the members together again by tightening the thumb-nut 29.

If it is desired to saw pieces which are substantially elliptical in form as illustrated in Fig. 1, the piece of material 19 from which the desired object is to be sawed, has a templet 21 attached thereto which is of the contour of the piece to be sawed, less the distance from the front edge of the guide plate 15 to the front edge of the saw 17. The plate 38 with the slide 40 thereon is first positioned upon the member 8, the said position being determined by the size of the piece of material to be sawed, and the plate is then firmly clamped to the member 8 by the bolt 35, collar 36 and nut 37, while the slide 40 is free to slide upon the plate 38 as the screw 53 does not engage said slide. The material 19 is then placed upon the band saw work table 5 in approximately the position illustrated in dotted lines Fig. 1. The handle 54 is then grasped and the slide 40 and plate 38 simultaneously moved against the action of the spring 48 to their dotted line position in Fig. 1, and the pin 46 is located in the slot 55 of the templet 21. The material is then moved into engagement with the saw blade 17 being guided at first by the operator until the templet engages the guide plate 15 as illustrated in full lines Fig. 1, after which the said material is fed by the operator to saw around the templet 21 upon the dotted line B, the said templet being at all times yieldingly held against the guide plate 15 by the action of the spring 43. At the completion of the operation, the templet 21 which has been temporarily attached by the pins 20 to the material 19 during the operation hereinbefore described is removed and the said operation is repeated with the same templet to produce another like-shaped article.

When sawing circular pieces as indicated by the dotted line C, Fig. 4, the slide 40 is adjusted to so locate the pin 46 that the distance between said pin and the saw blade 17 will constitute the radius of the piece to be sawed, and the slide is then secured in said position upon the plate 38 by tightening the screw 53 against the slide 40 and thereby clamping said slide and plate together. In starting the operation, the various parts are all positioned in approximately the same position as illustrated in dotted lines in Fig. 1. In this form, however, the use of a templet is dispensed with, and the point 47 of the pin 46 is caused to penetrate the material 56 and act as a center upon which the said material may rotate. The material 56 is brought into engagement with the saw blade 17 in the same manner as previously described in connection with Fig. 1 and after having reached the position illustrated in Fig. 4, it is only necessary to rotate the material 56 with the pin 46 as a center thereby sawing the material upon the dotted line C.

In sawing irregular shaped pieces as illustrated in Fig. 5, a templet 58 is utilized but the guide plate 15 is dispensed with and in its place the pin 46 constitutes the guide. In such cases it is preferable to remove the guide plate 15 and move the member 8 upon the member 7 a sufficient distance to remove the saw blade from the slot 16 in order that the guide block 13 and guide plate 15 will not interfere with the pin 46. In starting the operation, the material 57 is fed by the operator into engagement with the saw blade which will cut through said material as indicated at d, Fig. 5, until the pin 46 engages the edge 59 of the templet 58, and thereafter the material is fed by the operator with the edge of the templet engaging the pin 46, thereby sawing the material upon the dotted line D as indicated in Fig. 5.

By the use of this attachment for a band saw, very accurate work may be obtained with great speed.

Having thus described my invention, what I claim and desire by Letters Patent to secure is:

1. An attachment for band saw machines having, in combination, a guide frame provided with a slot for a band saw, means to fasten said guide frame to the work table of said band saw machine, a guide plate for a piece of material on said guide frame, and means to yieldingly position the piece of material relatively to said guide plate.

2. An attachment for band saw machines having, in combination, a guide frame provided with a slot for a band saw, means to fasten said guide frame to the work table of said band saw machine, a guide plate for a piece of material on said guide frame, means to yieldingly position the piece of material relatively to said guide plate, and means to adjust said guide frame vertically relatively to said work table.

3. An attachment for band saw machines having, in combination, a guide frame provided with a slot for a band saw, means to fasten said guide frame to the work table of said band saw machine, a guide plate for a piece of material on said guide frame, means to yieldingly position the piece of material relatively to said guide plate, and means to adjust said guide frame laterally with relation to said band saw.

4. An attachment for band saw machines having, in combination, a guide frame provided with a slot for a band saw and a guide plate having a curved guiding edge adjacent to said band saw, and adapted to be engaged by a piece of material to position the same to be cut by said band saw, and means to yieldingly position the piece of material relatively to said guide plate.

5. An attachment for band saw machines having, in combination, a guide frame provided with a slot for a band saw, means to fasten said guide frame to the work table of said band saw machine, a guide plate for a piece of material on said guide frame, a plate mounted to slide upon said guide frame and means slidably mounted upon said plate provided with means adapted to engage a piece of material and yieldingly hold said material against said guide plate.

6. An attachment for band saw machines having, in combination, a guide frame provided with a slot for a band saw, means to fasten said guide frame to the work table of said band saw machine, a guide plate for a piece of material on said guide frame, a plate mounted to slide upon said guide frame and pivotally attached thereto, and means slidably mounted upon said plate provided with means adapted to engage a piece of material and yieldingly hold said material against said guide plate.

7. An attachment for band saw machines having, in combination, a guide frame provided with a slot for a band saw, means to fasten said guide frame to the work table of said band saw machine, a guide plate for a piece of material on said guide frame, a plate mounted to slide upon said guide frame, means to simultaneously position and pivotally attach said plate to said guide frame, and means slidably mounted upon said plate provided with means adapted to engage a piece of material and yieldingly hold said material against said guide plate.

8. An attachment for band saw machines having, in combination, a guide frame, means to fasten said guide frame to the work table of a band saw machine, a guide block detachably fastened to said guide frame and provided with a notch in one edge thereof to permit the passage of a band saw therethrough, a guide plate fastened to said block extending across said notch and constituting a guide member for a piece of material to position the same to be cut by said saw, and means to yieldingly hold said piece of material against said guide plate.

9. An attachment for band saw machines having, in combination, a guide frame, means to fasten said guide frame to the work table of a band saw machine, a guide block detachably fastened to said guide frame and provided with a notch in one edge thereof to permit the passage of a band saw therethrough, a convexly curved guide plate fastened to said block extending across said notch and constituting a guide member for a piece of material to position the same to be cut by said saw, and means to yieldingly hold said piece of material against said guide plate.

10. An attachment for band saw machines having, in combination, a guide frame consisting of two flat strips, one slidable upon the other in a direction at right angles thereto, means to clamp said slidable strip to the other strip, means to clamp said guide frame to the work table of a band saw machine at varying distances thereabove, a guide plate for a piece of material on said first named strip, and means mounted upon said first named strip adapted to hold said piece of material against said guide plate.

11. An attachment for band saw machines having, in combination, a guide frame consisting of two flat strips, one slidable upon the other in a direction at right angles thereto, means to clamp said slidable strip to the other strip, means to clamp said guide frame to the work table of said band saw machine, said first mentioned strip being provided with a slot in one end thereof to enable a band saw to pass therethrough, one edge of said first named strip adjacent to said slot being provided with a guide plate adapted to guide a piece of material to position the same to be cut by said saw, and means mounted upon said first named strip adapted to hold said piece of material against said guide plate.

12. An attachment for band saw machines having, in combination, a guide frame consisting of two flat strips, one slidable upon the other in a direction at right angles thereto, means to clamp said slidable strip to the other strip, means to clamp said guide frame to the work table of said band saw machine, said first mentioned strip being provided with a slot in one end thereof to enable a band saw to pass therethrough, one edge of said first named strip adjacent to said slot being provided with a guide plate adapted to guide a piece of material to position the same to be cut by said saw, a plate pivotally mounted upon said first named strip, and a member adapted to slide upon said plate and yieldingly hold said piece of material against said guide plate.

13. An attachment for band saw machines having, in combination, a guide frame consisting of two flat strips, one slidable upon the other in a direction at right angles thereto, means to clamp said slidable strip to the outer strip, means to clamp said guide frame to the work table of said band saw machine, said first mentioned strip being provided with a slot in one end thereof to enable a band saw to pass therethrough, on edge of said first named strip adjacent to said slot being provided with a guide plate adapted to guide a piece of material to position the same to be cut by said saw, a plate pivotally mounted upon said first named strip, a slide upon said plate and a pin located in said slide adapted to engage said piece of material and co-operate with said slide to yieldingly hold said material against said guide plate.

14. An attachment for band saw machines having, in combination, a guide frame consisting of two flat strips, one slidable upon the other in a direction at right angles thereto, means to clamp said slidable strip to the other strip, means to clamp said guide frame to the work table of said band saw machine, said first mentioned strip being provided with a slot in one end thereof to enable a band saw to pass therethrough, one edge of said first named strip adjacent to said slot being provided with a guide plate adapted to guide a piece of material to position the same to be cut by said saw, a plate pivotally mounted upon said first named strip, a slide upon said plate, a pin located in said slide, and means to position said pin relatively to the cutting edge of said saw.

15. An attachment for band saw machines having, in combination, a guide frame consisting of two flat strips, one slidable upon the other in a direction at right angles thereto, means to clamp said slidable strip to the other strip, means to clamp said guide frame to the work table of said band saw machine, said first mentioned strip being provided with a slot in one end thereof to enable a band saw to pass therethrough, one edge of said first named strip adjacent to said slot being provided with a guide plate adapted to guide a piece of material to position the same to be cut by said saw, a plate pivotally mounted upon said first named strip, means to clamp said plate to said strip, a spring actuated slide upon said plate, a guide pin located in said slide adapted to position said material relatively to said saw, and means to position said guide pin relatively to the cutting edge of said saw.

In testimony whereof I have hereunto set my hand in the presence of two subscribing witnesses.

GEORGE H. WALLACE.

Witnesses:
 FRANKLIN E. LOW,
 JOHN B. RICHARDSON.